United States Patent [19]

Linder

[11] 3,910,890
[45] Oct. 7, 1975

[54] PREPARATION OF MORPHANTHRIDIN-6-(5H)-ONES

[75] Inventor: Jerome Linder, Westfield, N.J.

[73] Assignee: Sandoz, Inc., E. Hanover, N.J.

[22] Filed: Sept. 14, 1973

[21] Appl. No.: 397,228

Related U.S. Application Data

[63] Continuation-in-part of Ser. No. 299,216, Oct. 20, 1972, abandoned.

[52] U.S. Cl. ................. 260/239.3 T; 260/453 AM; 260/453 AR; 260/999; 204/158 HA
[51] Int. Cl.² ........................................ C07D 223/20
[58] Field of Search ............... 260/239.3 T, 453 AM

[56] References Cited
UNITED STATES PATENTS

| | | | |
|---|---|---|---|
| 3,250,796 | 5/1966 | McShane | 260/453 AM |
| 3,367,930 | 2/1968 | Schmutz et al. | 260/239.3 T |

OTHER PUBLICATIONS

Fieser et al., "Organic Chemistry," 3rd Ed., (Reinhold), (1956), pp. 535–540, 646–647.

*Primary Examiner*—Norma S. Milestone
*Assistant Examiner*—Robert T. Bond
*Attorney, Agent, or Firm*—Gerald D. Sharkin; Robert S. Honor; Thomas O. McGovern

[57] ABSTRACT

Substituted and unsubstituted morphanthridin-6-(5H)-ones, are prepared by treating an α-chloro-o-tolyl isocyanate with an aryl compound in the presence of a Friedel Crafts catalyst.

7 Claims, No Drawings

PREPARATION OF MORPHANTHRIDIN-6-(5H)-ONES

This is a continuation-in-part of U.S. Pat. application ser. No. 299,216, filed Oct. 20, 1972, now abandoned.

This invention relates to morphanthridin-6-(5H)-one and derivatives thereof. In particular, it relates to the preparation of morphanthridin-6-(5H)-ones, which are useful as intermediates in the preparation of compounds having pharmaceutical activity.

This invention relates to morphanthridin-6(5H)one and derivatives thereof. In particular, it relates to the preparation of morphanthridin-6-(5H)-ones, which are useful as intermediates in the preparation of compounds having pharamaceutical activity.

The process of this invention may be represented by the following reaction scheme;

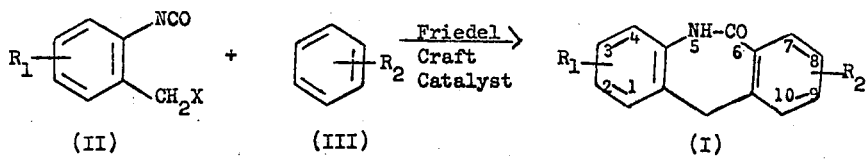

where
X is halo having an atomic weight of about 35 to 80 and
$R_1$ and $R_2$ each independently represent hydrogen, halogen having an atomic weight of about 19 to 80 or lower alkyl, that is, alkyl having 1 to 4 carbon atoms, e.g., methyl, ethyl, isopropyl and the like.

The compounds of formula (I) are prepared by treating a compound of formula (II) a compound of formula (III) in a solvent and in the presence of a Friedel Craft catalyst. The particular solvent used is not critical, but halogenated alkanes such as methylene dichloride, ethylene dichloride and the like, alkane such as hexane or heptane, or nitrobenzene are preferred, and excess reactant of formula (III) is especially preferred. The Friedel Crafts catalyst used can be any of the conventional Friedel Crafts catalyst, for example, ferric chloride, antimony chloride, boron trifluoride, zinc chloride, titanium tetrachloride, hydrofluoric acid, sulfuric acid, phosphoric acid, phosphorus pentoxide and the like, and especially aluminum trichloride. Although the temperature of the reaction is not critical, it is preferred that the reaction be run at temperatures between about −30° to 200°C, preferably from room temperature to the reflux temperature of the system and more preferably at the reflux temperature. The time of the reaction is not critical; but for opitmum results, the reaction should be run for from about 30 minutes to 3 hours. The product is separated by conventional techniques e.g., precipitation and recrystallization.

The compounds of formula (II) may be conveniently prepared by treating an o-tolyl isocyanate of the formula

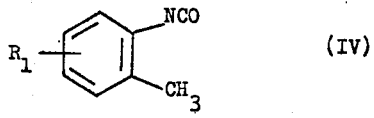

with anhydrous chlorine or bromine at a temperature of about 75° to 150° preferably 100° to 150°C. An inert solvent, such as higher halogenated hydrocarbons, for example, 1,1,2,2-tetrachloroethane, may be used; but it is preferred that the reaction be carried out in an excess of a compound of formula (IV). The time is not critical, but it is preferred that the reaction be carried out for from 10 minutes to 5 hours. It is preferred that the reaction be carried out in the presence of a light radiation source or a free radical initiator such as azobisisobutylnitrile, dibenzoyl peroxide and the like. It will be appreciated that when $R_1$ is lower alkyl, halogenation of this substituent could take place. This, of course, can be controlled by varying the reaction condition, and the desired reactant can be separated from the by-products by conventional techniques.

Many of the compounds of formulas (II), (III) and (IV) are known and may be prepared by techniques disclosed in the literature. The compounds of formulas (II), (III) and (IV) not specifically described in the prior art may be prepared from known starting materials either by analogous methods or methods described in this disclosure.

As indicated above, the compounds of formula (I) are useful as intermediates in the preparation of compounds having pharmaceutical activity. Such compounds, their preparation and their use are described in the literature, for example, U.S. Pat. No. 3,389,139.

EXAMPLE 1

Step A: α-chloro-o-tolyl isocyanate

Anhydrous chlorine gas is bubbled through 133 grams of o-tolyl isocyanate at 120° to 130°C under irradiation of a 200 watt bulb until 71 grams of chlorine is consumed. This product contains o-tolyl isocyanate, α-chloro-o-tolyl isocyanate and α,α-dichloro-o-tolyl isocyanate which is fractionated to remove all of the starting material, o-tolyl isocyanate. The desired α-chloro-o-tolyl isocyanate is then distilled at 115° to 130°C at 13 mm. yielding 144 grams of a mixture containing about 84% α-chloro-o-tolyl isocyanate and about 16%, α,α-dichloro-o-tolyl isocyanate.

When the above process is carried out using an equivalent amount of 5-chloro-2-tolyl isocyanate or 4-chloro-2-tolyl isocyanate in place of the o-tolyl isocyanate, there is obtained 5,α-dichloro-2-tolyl isocyanate or 4,α-dichloro-2-tolyl isocyanate.

Step B: Morphanthridin-6(5H)-one

To a solution consisting of 25 grams of aluminum chloride in 40 grams of anhydrous benzene is added dropwise at a temperature of 20° to 30°C, a solution consisting of 25 grams of a mixture containing about 84% α-chloro-o-tolyl isocyanate and about 16% α,α-dichloro-o-tolyl isocyanate in 40 grams of anhydrous benzene. The resulting reaction is very exothermic and the temperature of the reaction is maintained at about 20° to 30° until the addition is complete. The resulting reaction mixture is refluxed for about 2 hours, cooled and poured onto 200 ml of ice containing hydrochloric acid. The resulting solid is filtered and stirred in a dilute solution of sodium hydroxide. The mixture is filtered, dissolved in chloroform, filtered again and evaporated to dryness yielding 23.3 grams of technical morphanthridin-6(5H)-one. This product is crystallized from benzene to obtain 18.5 grams of morphanthridin-6(5H)-one (melting point 193°–196°C).

When the above process is carried out using an equivalent amount of 5,α-dichloro-2-tolyl isocyanate or 4,α-dichloro-2-tolyl isocyanate in place of the α-chloro-o-tolyl isocyanate, there is obtained 3-chloro-morphantridin-6(5H)-one (m.p. 273° to 275°C) or 2-chloro-morphantridin-6(5H)-one (m.p. 259°–261°c).

EXAMPLE 2

10-methyl-morphantridin-6(5H)-one

To a solution consisting of 10 grams of aluminum chloride in 10 grams of toluene is added dropwise, at a temperature of 20° to 30°C, a solution consisting of 5 grams of α-chloro-o-tolyl isocyanate in 10 grams of toluene. The resulting reaction is very exothermic and the temperature of the reaction is maintained at about 20° to 30°C until the addition is complete. The resulting reaction mixture is heated to reflux for 2 hours, cooled and poured onto 50 cc ice. The toluene layer is separated off and evaporated to dryness to obtain a viscous oil. The oil is eluted on a silica gel column with methylene chloride resulting in 3 grams of a solid which is crystallized from benzene to obtain 1.5 grams of 10-methyl morphan-thridin-6(5H)-one, (melting point 222.5° to 225.5°C.) C.)

When the above process is carried out using chlorobenzene in place of the toluene, there is obtained after fractionating the crude product obtained from the evaporation of the chlorotoluene extracts, 8-chloro-morphanthridin-6(5H)-one,(m.p. 237° to 239°C).

EXAMPLE 3

3-Chloromorphantridin-6(5H)-one

To a solution consisting of 38 grams of aluminum chloride in 225 grams of benzene is added dropwise, at a temperature of 20°–30°C., a solution consisting of 38 grams of 5,α-dichloro-2-tolyl isocyanate in 40 grams of benzene. The reaction mixture is refluxed for 4 hours, cooled and poured onto 500 grams of ice and water. The mixture is filtered and washed with benzene and water. The resulting solid is crystallized from xylene to yield 3-chloromorphanthridin-6(5H)-one (m.p. 273–275°C).

EXAMPLE 4

2-Chloromorphanthridin-6(5H)-one

To a solution consisting of 70 grams of aluminum chloride in 450 grams of benzene is added dropwise, at a temperature of 20°–30°C., a solution consisting of 60 grams of 4,α-dichloro-2-tolyl isocyanate in 45 grams of benzene. The reaction mixture is heated to reflux for 3 hours, cooled and poured onto 500 grams of ice and water. The mixture is filtered and washed with benzene and water. The resulting solid is crystallized from chloroform to yield 2-chloro-morphanthridin-6(5H)-one (m.p. 259°–261°C.)

EXAMPLE 5

8-Chloromorphanthridin-6(5H)-one

To a solution consisting of 100 grams of aluminum chloride in 700 grams of monochlorobenzene is added dropwise, at a temperature of 20°– 30°C, a solution consisting of 100 grams of a α-chloro-o-tolyl isocyanate in 200 grams of monochlorobenzene. The reaction mixture is refluxed for 5 hours, cooled and poured onto 1 liter of ice and water. The mixture is filtered and washed with monochlorobenzene and water. The resulting solid is crystallized twice from ethanol and once from ethyl acetate to yield 8-chloromorphanthridin-6(5H)-one (m.p. 237°–239°C).

What is claimed is:

1. A process for preparing a compound of the formula

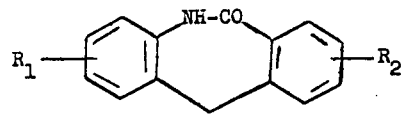

which comprises treating a compound of the formula

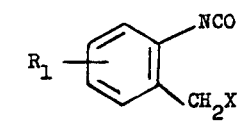

with a compound of the formula

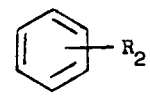

in an inert solvent and in the presence of a Friedel Crafts catalyst, where
 X is halo having an atomic weight of between 35 to 80 and
 $R_1$ and $R_2$ each independently represent hydrogen, halo having an atomic weight of between 19 to 80 lower alkyl.

2. A process according to claim 1 wherein the compound of the formula

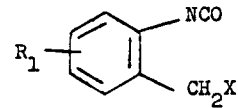

is prepared by treating a compound of the formula

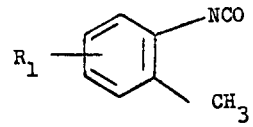

with anhydrous chlorine or bromine in the presence of a light radiation source.

3. A process according to claim 1 wherein morphanthridin-6(5H)-one is prepared by treating α-chloro-o-tolyl isocyanate with benzene.

4. A process according to claim 1 wherein 3-chloromorphanthridin-6(5H)-one is prepared by treating 5,α-dichloro-o-tolyl isocyanate with benzene.

5. A process according to claim 1 wherein 2-chloromorphanthridin-6(5H)-one is prepared by treating 4,α-dichloro-o-tolyl isocyanate with benzene 6. A process according to claim 1 wherein 8-chloromorphanthridin-6(5H)-one is prepared by treating α-chloro-o-tolyl isocyanate with chlorobenzene.

7. A process according to claim 3 wherein the α-chloro-o-tolyl isocyanate is prepared by treating o-tolyl isocyanate with anhydrous chlorine in the presence of a light radiation source.

* * * * *